US007337229B2

(12) United States Patent
Dutta et al.

(10) Patent No.: US 7,337,229 B2
(45) Date of Patent: Feb. 26, 2008

(54) METHOD AND APPARATUS FOR AUTHORIZING INTERNET TRANSACTIONS USING THE PUBLIC LAND MOBILE NETWORK (PLMN)

(75) Inventors: Santanu Dutta, Cary, NC (US); Angana Ghosh, Morrisville, NC (US)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 10/010,279

(22) Filed: Nov. 8, 2001

(65) Prior Publication Data

US 2003/0097444 A1 May 22, 2003

(51) Int. Cl.
G06F 15/16 (2006.01)

(52) U.S. Cl. ............... 709/229; 709/225; 709/203; 705/26; 726/3; 726/21

(58) Field of Classification Search ............ 709/229, 709/225–227, 249, 203, 217–219; 705/26; 713/173, 201; 726/3, 21
See application file for complete search history.

(56) References Cited

U.S. PATENT DOCUMENTS

| | | | | |
|---|---|---|---|---|
| 5,534,857 | A * | 7/1996 | Laing et al. ............... 713/171 |
| 6,366,893 | B2 * | 4/2002 | Hannula et al. ............ 705/40 |
| 6,504,839 | B2 * | 1/2003 | Valentine et al. .......... 370/354 |
| 6,567,661 | B2 * | 5/2003 | McDonnell et al. ........ 455/466 |
| 6,687,243 | B1 * | 2/2004 | Sayers et al. .............. 370/356 |
| 6,687,495 | B2 * | 2/2004 | Bhatia et al. ............ 455/414.1 |
| 6,726,092 | B2 * | 4/2004 | Goldberg et al. .......... 235/375 |
| 6,836,474 | B1 * | 12/2004 | Larsson et al. ............ 709/230 |
| 7,069,238 | B2 * | 6/2006 | I'Anson et al. ............ 705/26 |
| 2001/0039589 | A1 * | 11/2001 | Aho et al. ................ 709/230 |
| 2002/0004404 | A1 * | 1/2002 | Squibbs ................... 455/466 |
| 2002/0028671 | A1 * | 3/2002 | I'Anson et al. ........... 455/414 |
| 2002/0029172 | A1 * | 3/2002 | I'Anson et al. ........... 705/26 |
| 2002/0098832 | A1 * | 7/2002 | Fleischer et al. .......... 455/414 |
| 2002/0116285 | A1 * | 8/2002 | Ito ............................. 705/26 |
| 2002/0141358 | A1 * | 10/2002 | Requena .................. 370/329 |
| 2002/0141560 | A1 * | 10/2002 | Khayatan et al. .......... 379/219 |
| 2003/0236985 | A1 * | 12/2003 | Ruuth ....................... 713/173 |

FOREIGN PATENT DOCUMENTS

| | | |
|---|---|---|
| EP | 1102157 | 5/2001 |
| GB | EP 0883318 A1 * | 12/1998 |
| WO | WO 99/42961 * | 8/1999 |
| WO | WO9942961 A | 8/1999 |
| WO | WO 00/26838 | 5/2000 |
| WO | WO0059225 A | 10/2000 |

* cited by examiner

Primary Examiner—Philip Tran
(74) Attorney, Agent, or Firm—Michael Cameron (57) ABSTRACT

Method and apparatus for authorizing Internet transactions using the public land mobile network (PLMN). An association, or linking, of a mobile terminal to a transaction being made with a more traditional Internet access device such as a PC is provided using the resources of the public land mobile network (PLMN). The mobile terminal can in turn be used to provide authentication and/or authorization for the transaction. The link or coupling between the transaction documents or information sets presented on the two devices can be created by a service provider or merchant sending a WAP push message to the mobile terminal. Authentication and/or authorization can be provided using the client-side PKI capabilities of the wireless terminal, using a user ID and/or password, or through other means.

41 Claims, 8 Drawing Sheets

METHOD AND APPARATUS FOR AUTHORIZING INTERNET TRANSACTIONS USING THE PUBLIC LAND MOBILE NETWORK (PLMN)

BACKGROUND OF THE INVENTION

The Internet is a vast, public network of interconnected computers and smaller networks. As such, the Internet can provide a vehicle for monetary transactions, such as the purchasing of goods and services by consumers. Although these so-called "e-commerce" or "on-line shopping" transactions are reasonably common, the amount of e-commerce taking place over the Internet has generally fallen below historical expectations.

Security concerns of users and merchants alike have been partly to blame for the somewhat limited use of the Internet for e-commerce such as shopping. For example, there is no common way of reliably authenticating the user and creating records of transaction authorization that are viewed as non-repudiatable to the same extent as traditional paper records. A digitally signed purchase contract using the Public Key Infrastructure (PKI) might be used to create such a record. In theory, PKI allows authentication and signature of an electronic document with a user's key pair consisting of a public and private key. However, personal computers (PC's), which have been the most common client device used for e-commerce, have not been considered suitable for client-side PKI. Client-side PKI involves the ability to store keys on the client platform in a tamper resistant medium. There has been no widespread deployment of a device that provides this ability for a PC.

With the recent advent of mobile e-commerce, a security element (SE) is becoming an essential component of mobile phones and other mobile terminals, hereafter referred to simply as "mobile terminals" or "wireless communication terminals". The SE is a tamper-resistant, trusted component in a terminal that contains the private and public key-pairs used for authentication and digital signature functions in secure transactions. The SE may take many forms, including removable and non-removable types, relative to the mobile terminal. A well-known removable type of security element is the subscriber identity module (SIM), currently used in telephones that operate according to the Global System for Mobile (GSM) standard. Another known removable security element is the WAP identity module (WIM) where WAP stands for wireless application protocol, an over-the-air protocol designed to carry Internet traffic so that wireless communication terminals can run Internet protocol (IP) applications and be used for Internet access. Specifications for WAP can be obtained from the WAP Forum at www-.wapforum.org. A device that has telephone capability and WAP capability needs both SIM and WIM functionality, which may be provided by separate devices, or by a combination card with both functions, colloquially called a "SWIM" card.

The PKI capability of some mobile terminals provides a way of authenticating on-line transactions taking place over the wireless network. However, the mobile terminal does not provide a very pleasant "on-line shopping experience" due to its small, often monochrome screen and limited input/output (I/O) capabilities. There have been proposals to use the PKI capability of some mobile terminals to authenticate PC-based Internet transactions by locally connecting a user's mobile terminal to the user's PC, for example, with so-called "Bluetooth" short range radio technology. Thus far, however, hardware and software to accomplish this local connection has not become widely available.

BRIEF SUMMARY OF THE INVENTION

The present invention provides a way to associate or link a mobile terminal to a transaction being made with an Internet access device such as a PC, using the resources of the public land mobile network (PLMN). The mobile terminal can in turn be used to provide authentication and/or authorization for the transaction. In one embodiment, a method of providing authentication for a transaction includes the presentation to a user of a first document or information set to a user through an Internet access device such as a personal computer. This first set of information is associated with a transaction of some sort, and may be represented by data presented in hypertext markup language (HTML) format via a Web page. A coupling is created between the first information set and a second document or information set, wherein the second information set is also associated with the transaction. This second set of information is typically a document presented on a mobile terminal, which, for reasons of space, will often include a more limited amount of information about the transaction, but nevertheless, it is representative of the information in the first document. The second information set is automatically presented to the user at a mobile terminal using public land mobile network (PLMN) radio resources, and an authorization is requested. When the user indicates via the Internet access device that he/she is ready to authorize a contract related to the transaction, the mobile terminal is then used to authorize the transaction, and authorization and/or authentication information is sent from the mobile terminal to the merchant or service provider using PLMN radio resources so that the transaction is authorized. The user may be authenticated and the contract can be archived for future reference.

In some embodiments, the link or coupling between the two documents or information sets is created by a service provider or merchant sending a WAP push message to the mobile terminal. In one embodiment the push message includes a hyperlink to a "wireless web" page formatted in wireless markup language (WML). Authentication and/or authorization can be provided using the client-side PKI capabilities of the wireless terminal involving a digital signature performed by a private key stored in the SE of the mobile terminal. It may also be performed using a user ID and/or password, or through other means, perhaps in combination with the caller line identification (caller ID) capability of the mobile terminal. Note that where the mobile terminal can access the wireless web, it too is an Internet access device in the generic sense, but may not referred to as such in the context of this disclosure.

In some embodiments, the invention is implemented with a server system operable to create the first information set or document and the second information set or document as well as to create the coupling or link between the two. The server system typically includes an Internet connection and the capability to access the PLMN infrastructure, although this capability may also be provided through the Internet connection. In some embodiments the server system includes an HTML server and a WML server. These may reside on separate computing platforms, or they may simply be two logical pieces of software residing on the same computing platform. In any case, the server system operates at least in part by executing a computer program product including computer program instructions to implement portions of the invention. In this case, the computing platforms, program code, and network connections form the means for carrying out the invention.

BRIEF DESCRIPTION OF THE DRAWINGS

FIG. 2 is divided into FIGS. 2A-2C for convenience of presentation.

DETAILED DESCRIPTION OF THE INVENTION

As previously described, the invention, in the example embodiments shown herein, harnesses the capabilities of a wireless terminal to provide authentication services for on-line transactions. The mobile phone is emerging as a personal accessory, over whose security perimeter the phone's owner can maintain greater control than for an Internet access device such as a PC, which is often shared with other users. Hence, the term "personal trusted device", or PTD, has been used to describe the mobile phone by the MeT (Mobile electronic Transactions initiative), which represents an effort by multiple manufacturers to standardize core functions of mobile terminals related to e-commerce. The PTD is thus a more suitable instrument for user authentication and transaction authorization than a stand alone PC.

In some embodiments, the invention relies on the PKI capabilities of the mobile terminal. With PKI, a user is issued a key pair consisting of a public and private key. The same key pair can be used for multiple services by assigning multiple service certificates to the same key pair. Thus, many service certificates can be assigned to a small number of key pairs. Typically, two key pairs suffice: one for authentication and one for signature, also referred to as authorization. At various places throughout this disclosure the terms "authentication", "authorization", "digital signature" and "signing", are used either alone or together in reference to verifying the identity of a user and obtaining authorization to carry out a transaction. Such usage is meant to generically refer to either authentication and signature/authorization together or one of the two by itself.

A service certificate is an electronic document signed by a trusted third party—a certification agency (CA)—which states that a named entity is a certified user of the public key contained in the certificate for the service identified by the certificate number. A CA is also sometimes referred to as an issuer. Service certificates may be used as electronic credit cards in mobile e-commerce. Service certificates can also be referred to as identity documents. When they are used in commerce, an acquirer typically collects payment authorizations from multiple merchants and forwards them to the issuers for verification. An "acquirer" acts as a "middleman" in the payment clearance process, and deals with multiple merchants and issuers.

Figure 1:
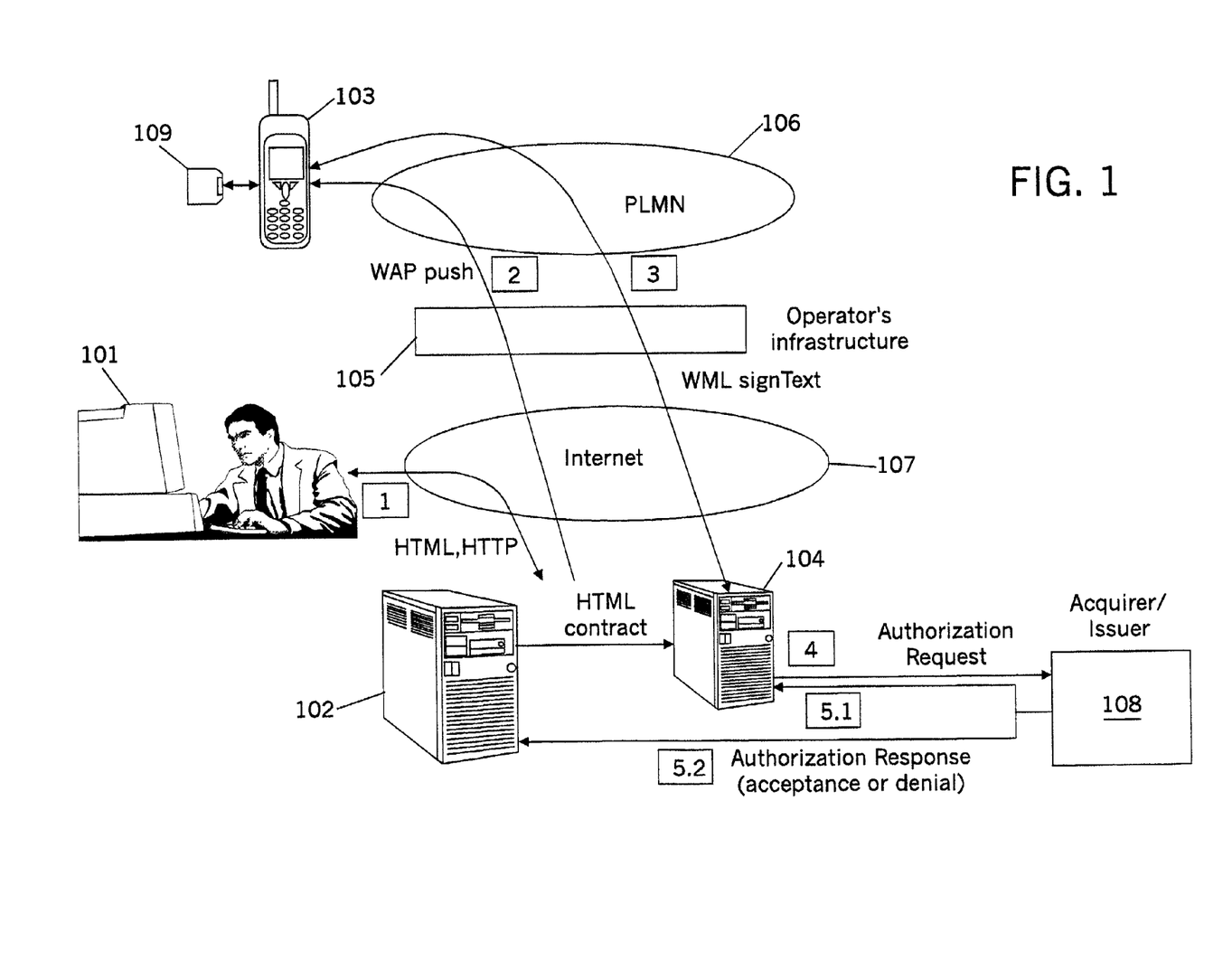
FIG. 1 is a network block diagram that illustrates both the network architecture and the overall method according to one embodiment of the invention.

FIG. 1 illustrates the network architecture and the high-level method according to example embodiments of the invention. In FIG. 1, reference number in boxes represent the various steps of the overall process of the invention. In another sense they also represent links between various apparatus in the network. Other reference numbers represent the apparatus or other "things" involved in carrying out this embodiment of the invention. At step 1, user 101 conducts an Internet transaction, such as web shopping, with server 102 in the usual way from a personal computer (PC), using HTML/HTTP and the Internet, 107. At some point in the transaction the user may be required to authenticate him/herself and/or authorize a transaction (such as a purchase). Instead of entering a username and password, the user is requested to enter a mobile phone number. The user enters the number of his already activated PTD, in this example, mobile phone 103 having SE 109, which she/he intends to use for authentication and authorization.

At this point, the content server 102 participating in the Internet transaction sends the PTD a WAP push message containing the uniform resource locator URL, also called a hyperlink of a WAP server, 104, or web site (hosting wireless markup language (WML) content), as shown at step 2. WAP push messages are described in well-known standard specifications published by the Wireless Application Protocol Forum including, "Wireless Application Protocol Push Message Specification," published Mar. 22, 2001, the most recent version of which is incorporated herein by reference. These messages can contain a hyperlink to which the PTD navigates if and when the message is accepted. The push message is sent through the wireless service operator's infrastructure, 105, and subsequently over the private land mobile network (PLMN), 106. When user 101 accepts the pushed message the PTD is directed to the URL.

The URL hyperlink is for the WAP web site, 104, where a WML contract, corresponding to the HTML contract on the PC, is presented to the user at step 3. The contract is presented as a signText string. The content of this contract may be a summarized version of the content of the HTML contract if the latter is too large to fit on a mobile phone screen. In any case, the information or information set presented on the mobile terminal will be representative of the information or information set presented on the PC. SignText is a scripting routine for performing a digital signature in the SE of a PTD, using a PKI service certificate issued to the user by a service provider. SignText is described in well-known standard specifications published by the Wireless Application Protocol Forum including, "WMLScript Crypto API Library Specification," published Mar. 22, 2001, the most recent version of which is incorporated herein by reference.

The user reads the WML contract and, if she/he agrees, signs the contract using the stored private key. The public key corresponding to the private key is contained in a certificate assigned to the user by a certificate authority (CA), who attests to the authenticity of the user. The certificate is used by the certificate issuer, which may be a bank or a wireless service operator, to check the user's signature. The CA and the issuer may be one and the same. In some cases the certificate will go through an acquirer first. The signed contract is forwarded to the acquirer or issuer, 108, by the web content provider (e.g. the web merchant) or whichever party is maintaining the WML web site for signature verification. This forwarding occurs in an authorization request message, as shown at step 4. After signature verification, the user is advised, both via the mobile phone through the WML server 104 via step/link 5.1 and via the PC through HTML sever 102 via step/link 5.2 of the outcome. For example, a message may state that the transaction is authorized, in which case a receipt message may be provided, or that the transaction was declined. The WML web site does not indicate any further steps in the authorization process and the HTML web site takes the user to the next step in the PC based transaction, such as a return to the shopping home page.

It should be noted that the PC shown in FIG. 1 as an Internet access device is an example only. This device could also be a set-top device, a network terminal in a public place, an appliance or home automation device with Internet access, etc. It should also be noted that WAP/WML messages to and from the mobile terminal in FIG. 1 are shown as passing to and from the operator's infrastructure, 105, through the Internet, 107. The messages in this case would normally pass through a WAP gateway, which is omitted for clarity. It is possible that these messages could be passed to the PLMN more directly, for example, if the merchant or owner of the servers was also the wireless operator. The specific network architecture shown in FIG. 1 is shown by way of example only. Also, throughout this disclosure, when the terms HTML and WML are used they are meant to refer to any and all variations of these languages, such as other mark-up languages. For example, the term HTML also encompasses XML and subsequent related languages. An information set or screen of information presented in any of these languages is often referred to as a document. However, the terms "contract", "screen", "information set", or "set of information" are used herein to distinguish these screens from identity documents such as the certificates previously discussed. The term "contract" may or may not implicate to the legal usage of the term. Finally, the term "Internet access device" is used in this disclosure to refer to an Internet access device such as a personal computer or set-top web access device that is a more traditional, usually HTML based, device. A WAP-based PTD is also, generically speaking, an Internet access device, since it can access the "wireless Web." However, the term "mobile terminal" or "wireless terminal" is used in the context of this disclosure to distinguish it from the more traditional devices. This term is also used in recognition of the fact that the invention can work with mobile terminals that are not Web-enabled.

Figure 2A:
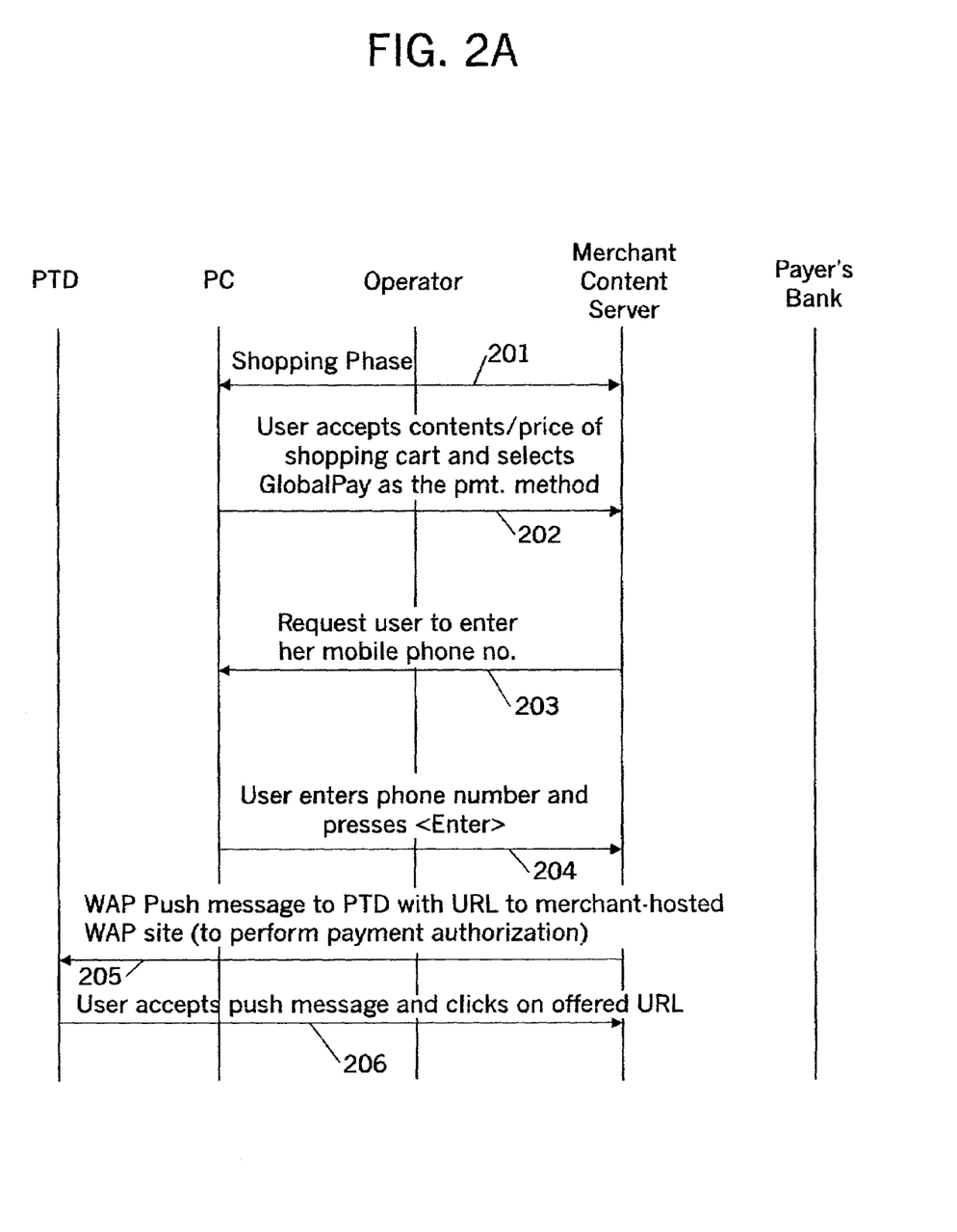
FIG. 2 is a message flow diagram that illustrates the processing of a transaction according to an example embodiment of the invention.
Figure 2B:
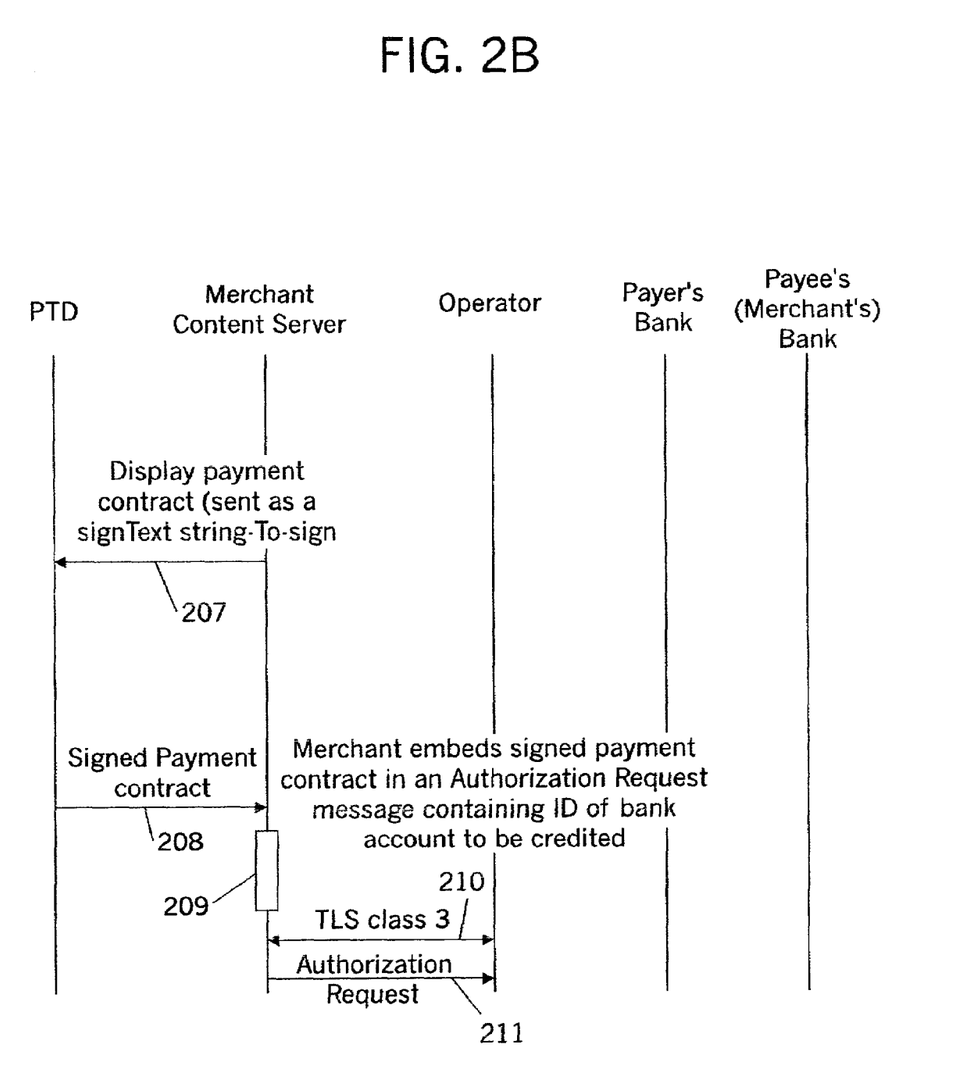
Figure 2C:
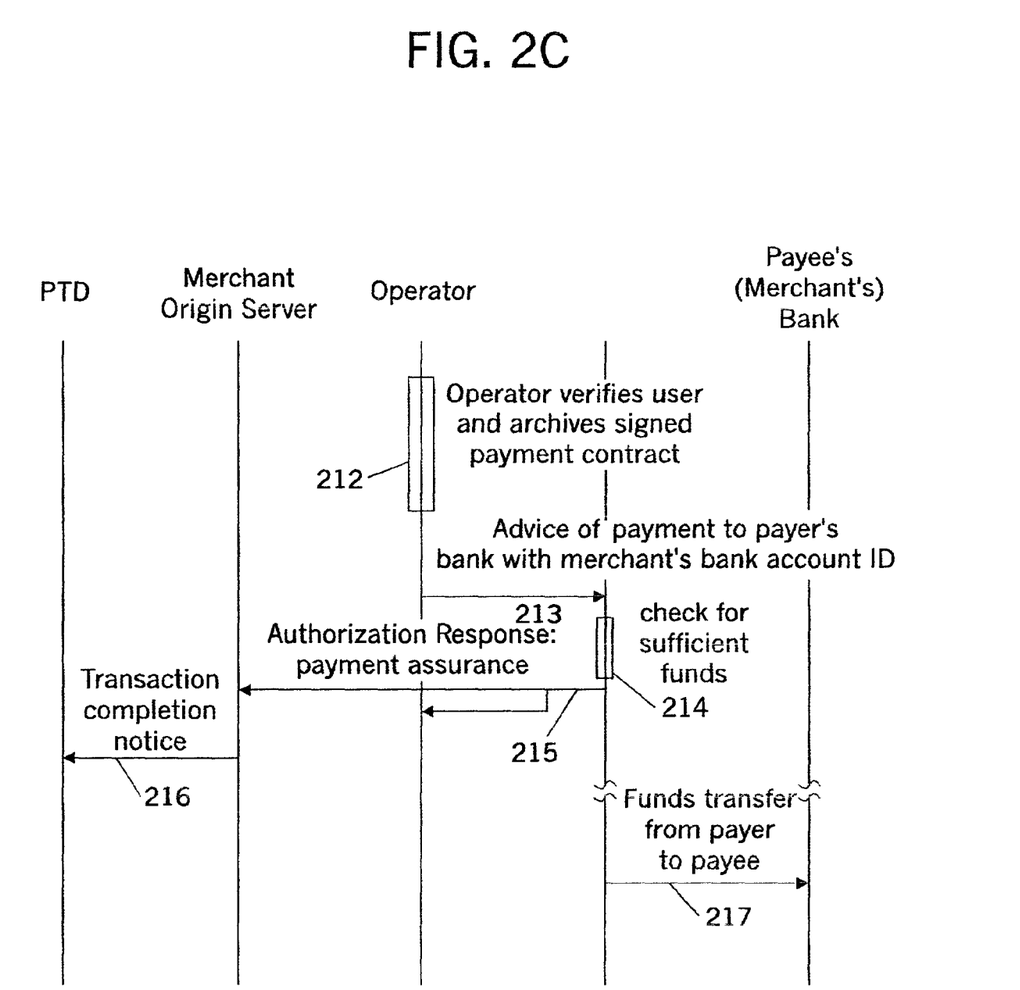

A more detailed Web shopping example illustrating the operation of the invention will now be discussed with reference to FIGS. 2-9. FIG. 2 is divided into FIGS. 2A, 2B, and 2C for more comfortable viewing. Together, the parts of FIG. 2 represent the detailed message flow of the example. FIGS. 3-9 illustrate example screens that are presented at various points. It is assumed that a user is shopping via a PC connected to the Internet and accessing a content server hosting an HTML website, such as a Web shop. In this example we use the fictitious name, "Best Books" for the name of the Web merchant who maintains the merchant content server for the web shop. The user has a WAP enabled mobile phone, referred to in the drawings at a PTD. In this case, the content server also hosts the WAP/WML site. The content server will also include a push initiator (PI), software to format the push message and send the push message to the user's phone.

In this example, it is also assumed that WAP version 1.2 is present on the phone, and that a WIM module in the form of a tamper resistant smart card is installed, and that the phone is configured to accept WAP push messages. A WAP gateway connects the Internet to the wireless operator's infrastructure. It should also be noted that WAP 1.2 supports signText, in which a script is sent by the content server to the phone and is executed when the user accepts the offered contract. Execution of the script causes a digital signature to be made on the contract and the signed contract is returned to the content server. The digital signature is one form of authentication/authorization information.

In this example, the wireless operator acts as an acquirer/issuer, or a payment broker, in a fictitious payment system called GlobalPay. The operator authenticates the user and forwards payment advice to the user's bank, with whom the operator has a trust relationship supported by the user, and from which payments are made to the payee, the Web merchant in the present example. It is noteworthy that entities other than the operator (e.g. a bank or a credit card organization) could assume the role of the acquirer or issuer in this example, and a different payment clearance system could be used without deviating from the essence of the invention.

Figure 3:
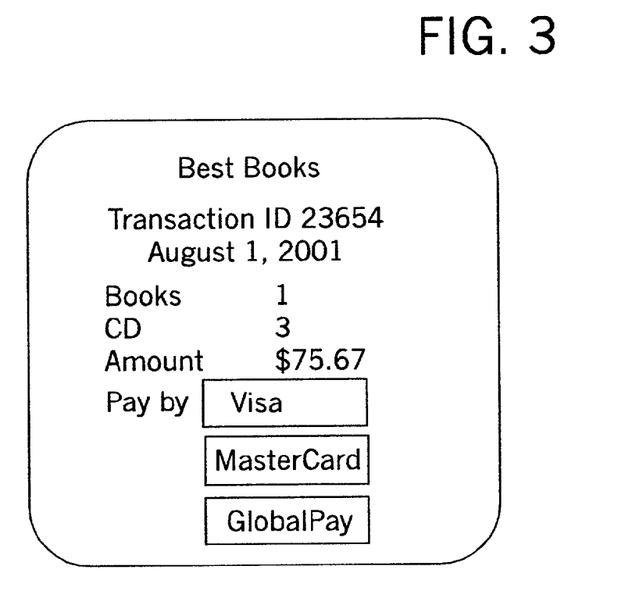
FIG. 3 is an example screen display that might be encountered by a user at an Internet access device when the transaction of FIG. 2 is being processed.
Figure 4:
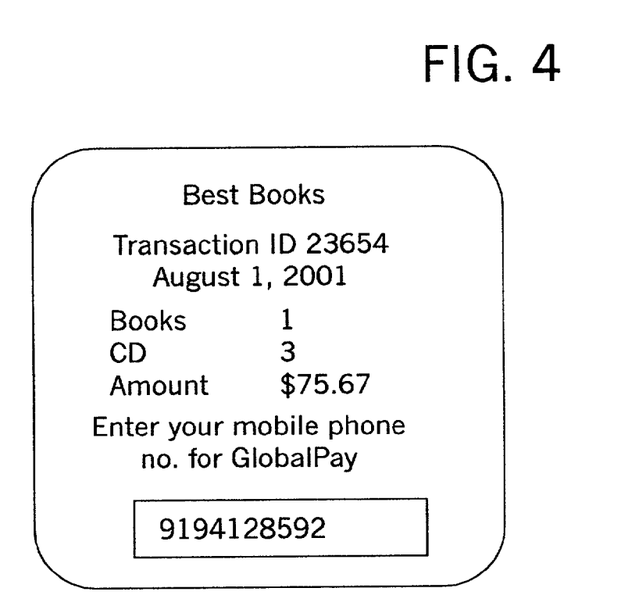
FIG. 4 is another example screen display that might be encountered by a user at an Internet access device when the transaction of FIG. 2 is being processed.
Figure 5:
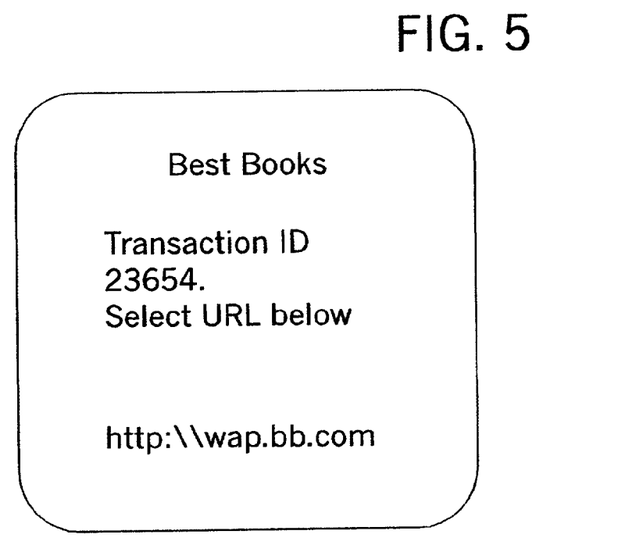
FIG. 5 is an example screen display that might be encountered by a user at the mobile terminal when the transaction of FIG. 2 is being processed.

The user in this example holds an ID service certificate issued by an operator. The service certificate is carried in the phone and refers to a PKI key-pair carried in the WIM smart card in the phone. The message flow begins with the shopping phase, 201, where the user at the PC fills a "shopping cart" and proceeds to the "check out" point. In the check out screen the user is prompted to select a payment method. Here, the user selects GlobalPay. The messaging is shown at 202 of FIG. 2, and an example screen for this step is shown in FIG. 3.

In the next screen (FIG. 4), the merchant server prompts the user to enter a mobile phone number as shown at 203. The user enters the number of the active, WAP-enabled, mobile phone that is in coverage of a PLMN at step 204. The merchant server sends a WAP push message at 205 to the above phone number, illustrated in FIG. 4 as the fictitious number "919-412-8592." The message contains the transaction ID of the Web shopping cart and the name of the merchant. These cross-referencing data items enable the user to correlate the message with the PC-based shopping cart. The message also contains the URL of the WAP site hosted by the merchant where user authentication and payment authorization will be performed. The phone/PTD screen display in FIG. 5 results.

Figure 6:
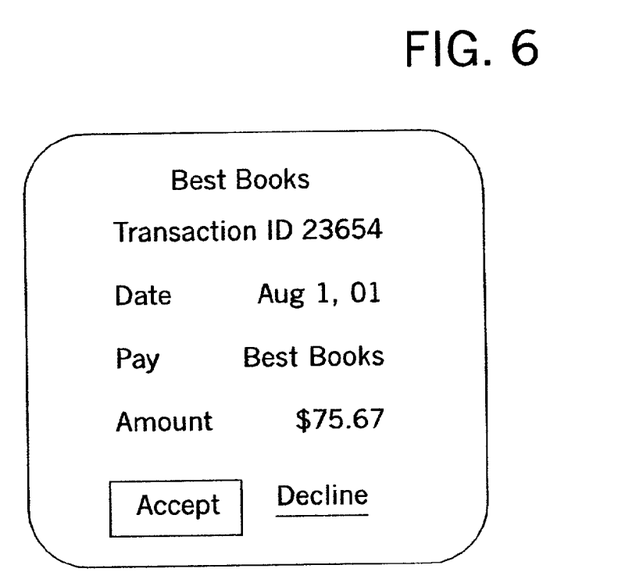
FIG. 6 is another example screen display that might be encountered by a user at the mobile terminal when the transaction of FIG. 2 is being processed.

The user accepts the push message at step 206. This acceptance may be made by clicking on the offered URL, or other means, in which case a link to the URL may be automatically made by the phone. A link or coupling between the information set presented by the WML server to the phone and the information set or document presented by the HTML server to the PC has now been created. This takes the user to step 207, where a WML payment contract is presented to her as a signText string-to-sign, as if the shopping session had been conducted entirely over the mobile phone. The screen presented at the mobile terminal for this step is shown in FIG. 6.

Figure 7:
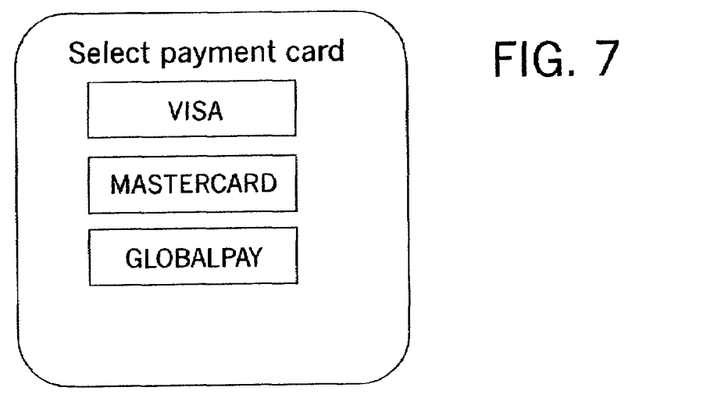
FIG. 7 is another example screen display that might be encountered by a user at the mobile terminal when the transaction of FIG. 2 is being processed.

The signText script message comes with a list of CA's supported by the merchant, of which GlobalPay is one. According to the published specification of the signText script, execution of the script in the PTD causes the matching service certificates to be presented to the user. The user would select the certificate (equivalent to a stored soft credit card in a virtual wallet in the phone) with which she/he wishes to pay. In this example, these are presented at another screen on the mobile terminal, as shown in FIG. 7. However, if the acquirer supported only one certificate, as might be the case if the operator were the acquirer and wished to promote only its own "GlobalPay" service, the certificate selection step could be omitted.

Figure 8:
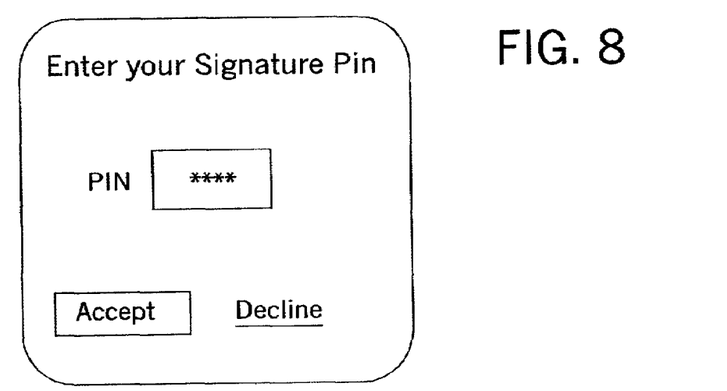
FIG. 8 is another example screen display that might be encountered by a user at the mobile terminal when the transaction of FIG. 2 is being processed.
Figure 9:
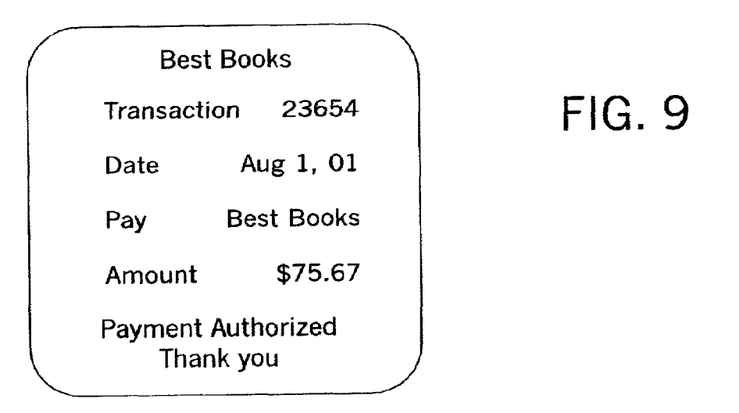
FIG. 9 is another example screen display that might be encountered by a user at the mobile terminal when the transaction of FIG. 2 is being processed.

After the user has selected a service certificate, she/he is prompted to enter the signature (non-repudiation) personal identification number (PIN) corresponding to the service certificate. This PIN could be unique to the service certificate, if the certificate uses a unique PKI key-pair in the WIM card, or could be common with other service certificates if the certificates share a key-pair. The PIN entry screen is shown in FIG. 8. At this point the signed contract is transmitted back to the merchant at step 208. It should be noted that the merchant is not required to provide PKI support (signature decryption and CA trace-back). The merchant simply embeds the signed object in an authorization request at step 209, which includes additional information such as the merchant's accounts receivable bank account ID.

A secure link is established between the operator and the merchant at step 210. Transport layer security (TLS) class 3 secure socket layer protocol is shown as an example where the Internet is used for the transmission; other protocols and/or a dedicated network could also be used. The authorization request is sent to the operator over the secure link providing encryption and client authentication at step 211. The payer-operator's network address is obtained by the merchant server from the service certificate, where it resides as a private extension.

At 212 the operator verifies the user and archives the signed payment contract for potential future use, including use in repudiation disputes. An advice of payment is sent to the payer's bank at 213. The notification includes the payee's (merchant's) accounts receivable bank account ID. The payer's bank performs a sufficient funds verification in real time at 214. This process is similar to the processing of debit card authorizations. The bank provides an authorization response (indication of whether payment will be made) to the merchant's server and the operator at step 215. The operator marks the transaction as approved or disapproved in a database for potential future use. Based on the result of the authorization response, the merchant server sends a transaction completion notice to the PTD at 216, resulting in a screen display on the PTD like that shown in FIG. 9. This can serve as a digital receipt. The funds transfer occurs, possibly sometime later, at step 217.

It should be noted that the linking of the two information sets or contracts together does not require the use of signText scripts or PKI. The invention could rely on other authentication means, still providing the security of authentication through a PTD with a more certain security perimeter than a PC or similar Internet access device. Alternative authentication/authorization information collected could include username and/or password, caller/calling line identification (caller ID), a PIN alone, biometric authentication, or some combination of the forgoing.

Figure 10:
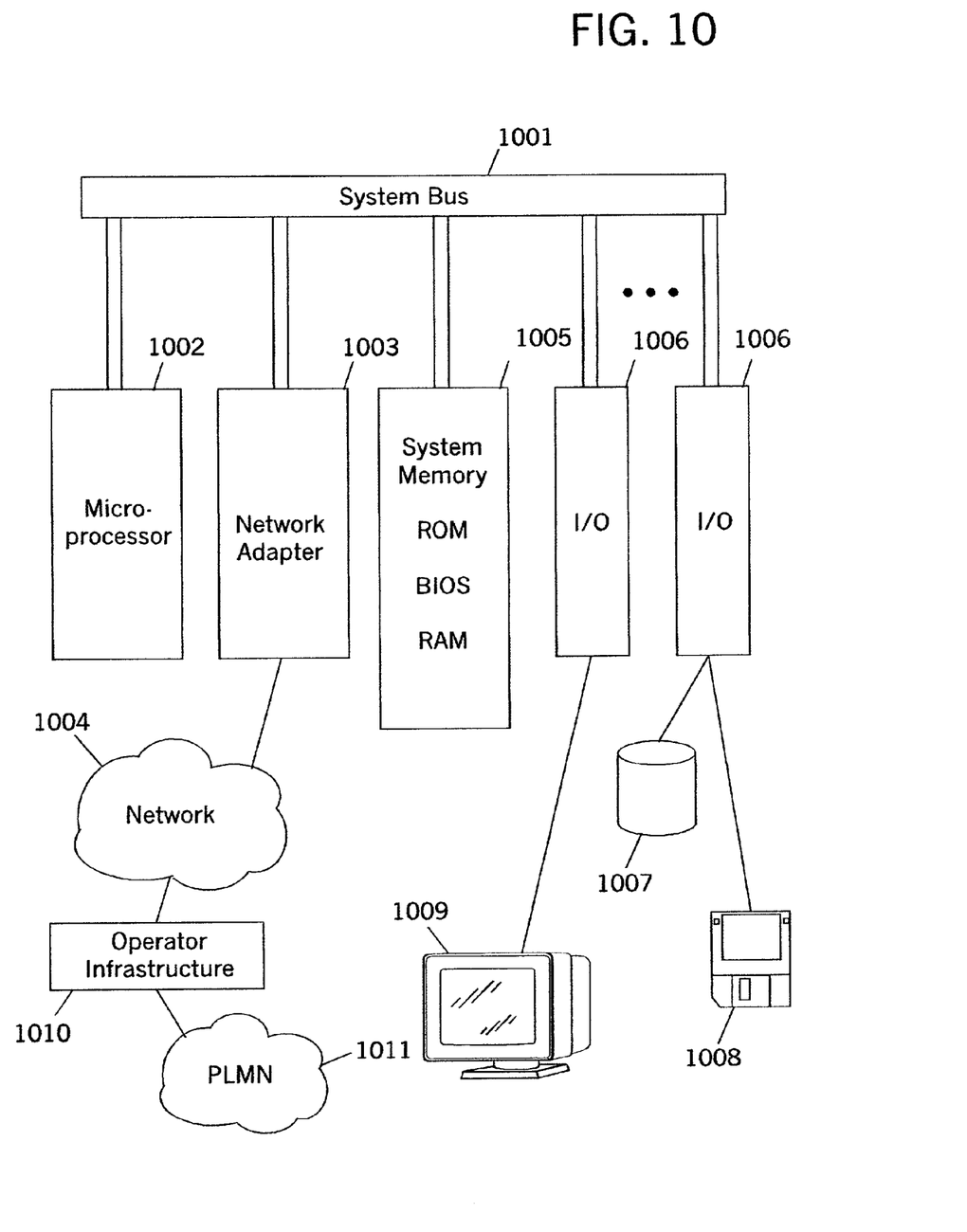
FIG. 10 is a system block diagram of a computer platform implementing a server system according to one embodiment of the invention.

Although the invention operates within the context of networks, software that can be used to implement the invention resides on and runs on one or more computer systems, which in one embodiment, are personal computers, workstations, or servers, or other instruction execution systems, such as might be owned or operated by the Web merchant and/or operator. FIG. 10 illustrates further detail of a computer system that is implementing part of the invention in this way. As previously discussed, the HTML and WML servers of the example embodiments can be running on a single computing platform, or on separate computing platforms. System bus 1001 interconnects the major components. The system is controlled by microprocessor 1002, which serves as the central processing unit (CPU) for the system. System memory 1005 is typically divided into multiple types of memory or memory areas, such as read-only memory (ROM), random-access memory (RAM) and others. If the computer system is an IBM compatible personal computer, the system memory also contains a basic input/output system (BIOS). A plurality of general input/output (I/O) adapters or devices, 1006, are present. Only two are shown for clarity. These connect to various devices including a fixed disk, 1007, a diskette drive, 1008, and a display, 1009.

The computer program instructions for implementing the portion of the linking and authentication functions performed by such a system are stored on the fixed disk, 1007, and are partially loaded into memory 1005 and executed by microprocessor 1002. The system also includes another I/O device, a network adapter or modem, shown at 1003, for connection to the Internet, 1004 to communicate with the operator's infrastructure 1010 and in turn with the PLMN, 1011. It should be noted that the system as shown in FIG. 7 is meant as an illustrative example only. Numerous types of general-purpose computer systems are available and can be used. Available systems include those that run operating systems such as Windows™ by Microsoft and various versions of UNIX.

Elements of the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system or a group of instruction execution systems. Such mediums are shown in FIG. 10 to represent the diskette drive, and the hard disk. In the context of this document, a computer-usable or computer-readable medium may be any medium that can contain, store, communicate, propagate, or transport the program for use by or in connection with the instruction execution system, apparatus, or device. A computer program product used in implementing the invention can also be transferred or "downloaded" over the Internet or otherwise from another server or computer system. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Various memory types can be used, for example, to store portions of code at the mobile terminal that relate to the invention. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the telecommunications and computing arts will quickly recognize that the invention has other applications in other environments. In fact, many embodiments and implementations are possible. The following claims are in no way intended to limit the scope of the invention to the specific embodiments described above. In addition, the recitation "means for" is intended to evoke a means-plus-function reading of an element in a claim, whereas, any elements that do not specifically use the recitation "means for," are not intended to be read as means-plus-function elements, even if they otherwise include the word "means."

We claim:

1. A method of providing authentication for a network-based transaction, the method comprising:
   presenting a first information set to a user through a first device accessible to the user, such first device being an Internet access device, the first information set being associated with the transaction and communicated to said first device over a first communication network;
   obtaining a second information set using authentication/authorization resources used in a second communication network, such second communication network being the public land mobile network (PLMN) which is separate from the first communication network;
   creating a coupling between the first information set and the second information set, wherein the second information set is also associated with the transaction;
   presenting the second information set to the user through a second device being a mobile terminal separate from the first device and requesting authorization of the transaction at the second device using the PLMN while the transaction is pending at the first device; and
   receiving authorization information for the transaction from the second device over the PLMN wherein in response to said authorization, providing said transaction to said user using said first device over said first communication network.

2. The method of claim 1 wherein creating the coupling further comprises sending a wireless application protocol (WAP) push message to the second device.

3. The method of claim 2 wherein the authorization information comprises client-side public key infrastructure (PKI) information.

4. The method of claim 1 wherein the authorization information comprises client-side public key infrastructure (PKI) information.

5. The method of claim 1 wherein the authorization information comprises a password.

6. The method of claim 5 wherein the authorization information further comprises a caller line identification (caller ID) for the second device.

7. A method of authorizing a transaction in which transaction information is presented to a user at first device coupled to a first communication network, in a first information set in a first format suitable for presentation on the first device wherein said first information set is communicated to said first device over the first communication network, the method comprising:
   while the transaction is pending at the first device, creating a second information set in a second format suitable for presentation at a second device, being a mobile terminal, wherein the second information set is representative of, and correlated to, the first information set;
   linking the first information set and the second information set;
   sending the second information set to said second device using a second communication network, the second communication network being the public land mobile network (PLMN) which is separate from the first communication network;
   receiving authentication information from the second device through the PLMN; and
   providing said transaction to said user using said first device over said first communication network in response to said step of receiving said authentication information.

8. The method of claim 7 wherein linking the first information set and the second information set further comprises sending a wireless application protocol (WAP) push message to the second device.

9. The method of claim 8 wherein the WAP push message comprises a hyperlink to the second information set.

10. The method of claim 9 wherein the first information set is formatted in hypertext markup language (HTML) and the second information set is formatted in wireless markup language (WML).

11. The method of claim 10 wherein the second information set is further formatted to be signed by a user using a WAP signText script.

12. The method of claim 7 wherein the authentication information comprises client-side public key infrastructure (PKI) information.

13. The method of claim 8 wherein the authentication information comprises client-side public key infrastructure (PKI) information.

14. The method of claim 9 wherein the authentication information comprises client-side public key infrastructure (PKI) information.

15. The method of claim 10 wherein the authentication information comprises client-side public key infrastructure (PKI) information.

16. Apparatus for providing authentication for a network-based transaction, the apparatus comprising:
   means for presenting a first information set to a user through first device, being an Internet access device, the first information set being associated with the transaction and communicated over to said first device over a first communication network;
   means for obtaining a second information set using authentication/authorization resources used in a second communication network, such second communication network being the public land mobile network (PLMN) which is separate from the first communication network;
   means for creating a coupling between the first information set and the second information set, wherein the second information set is also associated with the transaction;
   means for presenting the second information set to the user and requesting authorization of the transaction at a second device comprising a mobile terminal using a the PLMN; and means for receiving authorization information for the transaction from the second device over the PLMN while the transaction is pending at the first device wherein in response to said authorization, providing said transaction using said first device over said first communication network.

17. A computer program product having instructions embedded in a computer readable storage medium, when executed by one or more processors, for authorizing a transaction in which transaction information is presented to a user at a first device being an Internet access device in a first information set in a first format suitable for presentation on the first device wherein said first information set is communicated over to said first device over a first communication network, the computer program product comprising:

instructions for creating a second information set in a second format suitable for presentation at a second device being a mobile terminal, wherein the second information set is representative of the first information set;

instructions for linking the first information set and the second information set; instructions for sending the second information set to said second device over a second communications network being a public land mobile network (PLMN) which is separate from the first communication network;

instructions for receiving authentication information from the second device through the PLMN while the transaction is pending at the first device; and instructions for providing said transaction to said user at said first device over said first communication network in response to said step of receiving said authentication information.

18. The computer program product of claim 17 wherein the instructions for linking the first information set and the second information set further comprise instructions for sending a wireless application protocol (WAP) push message to the second device.

19. The computer program product of claim 18 wherein the WAP push message comprises a hyperlink to the second information set.

20. The computer program product of claim 19 wherein the first information set is formatted in hypertext markup language (HTML) and the second information is formatted in wireless markup language (WML).

21. The computer program product of claim 20 wherein the second information set is further formatted to be signed by a user using a WAP signText script.

22. The computer program product of claim 17 wherein the authentication information comprises client-side public key infrastructure (PKI) information.

23. The computer program product of claim 18 wherein the authentication information comprises client-side public key infrastructure (PKI) information.

24. The computer program product of claim 19 wherein the authentication information comprises client-side public key infrastructure (PKI) information.

25. The computer program product of claim 20 wherein the authentication information comprises client-side public key infrastructure (PKI) information.

26. A network that enables authentication of a transaction comprising:

a server system operable to create a first information set formatted for a first device being an Internet access device and a second information set formatted for a second device being a mobile terminal, the second information set representative of the first information set which is in turn representative of the transaction, the server system further operable to create a coupling between the first information set and the second information set wherein said first information set is communicated to said first device over a first communications network being a wireline communication network;

an Internet connection at the server system;

a second communications network being a public land mobile network (PLMN) which is separate from the first communications network operatively connected to the server system to communicate the second information set to said second device and obtain authorization information from the second device while the transaction is pending at the first device so that the transaction can be authenticated by the server system wherein in response to obtaining such authorization information, said server providing said transaction to said user at said first device over said wireline communication network; and wherein said first device and said second device are two separate devices.

27. The network of claim 26 wherein creating the coupling between the first information set and the second information set is accomplished at least in part by sending a wireless application protocol (WAP) push message to the second device.

28. The network of claim 27 wherein the WAP push message comprises a hyperlink to the second information set.

29. The network of claim 28 wherein the authentication information comprises client-side public key infrastructure (PKI) information.

30. The network of claim 26 wherein the authentication information comprises client-side public key infrastructure (PKI) information.

31. The network of claim 27 wherein the authentication information comprises client-side public key infrastructure (PKI) information.

32. A system for authorizing a transaction in which transaction information is presented to a user at a first device being an Internet access device in a first information set in a first format suitable for presentation on the first device, the system comprising:

a hypertext markup language (HTML) server operable to provide content for the first information set and to create a coupling between the first information set and a second information set wherein said first information set is communicated over to said first device over a first communications network being a wireline communication network;

a wireless markup language (WML) server operable to create the second information set in a format suitable for presentation on a second device being a wireless terminal, wherein the second information set is representative of the first information set, the WML server operatively connected to the HTML server;

a network connection for the system operable to enable the WML server to send the second information set over a second communications network being a public land mobile network (PLMN), which is separate from the first communications network, for presentation to the user at the second device while the transaction is pending at the first device, and receive authentication information from the second device and wherein in response to receiving said authentication information, providing said transaction to said user at said first device over said first communication network; and wherein said first device and said second device being two separate devices.

33. The system of claim 32 wherein the WML server and the HTML server operate on a single computing platform.

34. The system of claim 33 wherein the coupling is created at least in part by sending a wireless application protocol (WAP) push message to the second device.

35. The system of claim 33 wherein the authentication information comprises client-side public key infrastructure (PKI) information.

36. The system of claim 32 wherein the first communications network is the Internet.

37. The system of claim 36 wherein the coupling is created at least in part by sending a wireless application protocol (WAP) push message to the second device.

38. The system of claim 36 wherein the authentication information comprises client-side public key infrastructure (PKI) information.

39. The system of claim 32 wherein the coupling is created at least in part by sending a wireless application protocol (WAP) push message to the second device.

40. The system of claim 39 wherein the authentication information comprises client-side public key infrastructure (PKI) information.

41. The system of claim 32 wherein the authentication information comprises client-side public key infrastructure (PKI) information.

* * * * *

UNITED STATES PATENT AND TRADEMARK OFFICE
CERTIFICATE OF CORRECTION

| | | |
|---|---|---|
| PATENT NO. | : 7,337,229 B2 | Page 1 of 1 |
| APPLICATION NO. | : 10/010279 | |
| DATED | : February 26, 2008 | |
| INVENTOR(S) | : Dutta et al. | |

It is certified that error appears in the above-identified patent and that said Letters Patent is hereby corrected as shown below:

On the Title Page, item (73), under "Assignee", in Column 1, Line 1, delete "Telefonktiebolaget" and insert -- Telefonaktiebolaget --, therefor.

In Column 11, Line 45, in Claim 20, after "information" insert -- set --.

Signed and Sealed this

Thirtieth Day of September, 2008

JON W. DUDAS
*Director of the United States Patent and Trademark Office*